United States Patent
Meyer et al.

(10) Patent No.: US 8,017,887 B2
(45) Date of Patent: Sep. 13, 2011

(54) METHOD FOR CONNECTING COMPONENTS BY LOCAL COLD JOINING, USING FOR EXAMPLE RIVETS OR SCREWS AND LASER WELDING

(75) Inventors: Gerd Meyer, Leverkusen (DE); Dirk Petring, HE Kerkrade (NL); Claudia Peuker, Düsseldorf (DE); Norbert Wolf, Stolberg (DE)

(73) Assignee: Siemens Aktiengesellschaft, Munich (DE)

( * ) Notice: Subject to any disclaimer, the term of this patent is extended or adjusted under 35 U.S.C. 154(b) by 967 days.

(21) Appl. No.: 11/667,547

(22) PCT Filed: Sep. 19, 2005

(86) PCT No.: PCT/EP2005/054650
§ 371 (c)(1),
(2), (4) Date: Nov. 19, 2007

(87) PCT Pub. No.: WO2006/051022
PCT Pub. Date: May 18, 2006

(65) Prior Publication Data
US 2008/0210672 A1    Sep. 4, 2008

(30) Foreign Application Priority Data
Nov. 11, 2004    (DE) .................... 10 2004 054 582

(51) Int. Cl.
*B23K 26/28* (2006.01)
(52) U.S. Cl. ................................. 219/121.64
(58) Field of Classification Search ............. 219/121.64, 219/121.14
See application file for complete search history.

(56) References Cited

U.S. PATENT DOCUMENTS

| | | | | |
|---|---|---|---|---|
| 4,237,364 A | * | 12/1980 | Lemelson | 219/121.63 |
| 4,680,912 A | * | 7/1987 | Pantalone | 52/847 |
| 6,516,583 B1 | * | 2/2003 | Houghton | 52/655.1 |
| 6,593,540 B1 | * | 7/2003 | Baker et al. | 219/121.63 |
| 2002/0038566 A1 | * | 4/2002 | Jokisch | 72/462 |
| 2004/0031561 A1 | * | 2/2004 | Ely et al. | 219/121.64 |
| 2005/0188585 A1 | * | 9/2005 | Vicate | 42/71.01 |

FOREIGN PATENT DOCUMENTS

| | | | |
|---|---|---|---|
| DE | 19736851 A1 | * | 3/1999 |
| EP | 0 937 841 | | 8/1999 |
| EP | 0 988 917 | | 3/2000 |

(Continued)

OTHER PUBLICATIONS

Machine translation of Japan Patent document No. 5-174,940, Sep. 2010.*
Machine translation of Japan Patent document No. 11-297,373-A1, Sep. 2010.*

(Continued)

*Primary Examiner* — Geoffrey S Evans
(74) *Attorney, Agent, or Firm* — Harness, Dickey & Pierce, P.L.C.

(57) ABSTRACT

A method for connecting two or more components including overlapping surface sections via a laser beam. In the method, prior to the laser welding, the components are fixed in a positive fit to at least one of the overlapping surface sections by local cold joining, preferably via rivets or screws and are then laser welded, a laser weld seam being created in close proximity to each fixing point that has been produced by cold joining, in particular as close as possible to the rivet or screw.

14 Claims, 3 Drawing Sheets

FOREIGN PATENT DOCUMENTS

| | | | | |
|---|---|---|---|---|
| JP | 5-174940 | A | * | 7/1993 |
| JP | 11-297373 | A1 | * | 10/1999 |
| JP | 2001-191968 | A | * | 7/2001 |
| JP | 2002-126872 | A | * | 5/2002 |
| JP | 2003-220489 | A | * | 8/2003 |

OTHER PUBLICATIONS

Machine translaion of Japan Paten document No. 2003-220,489, Sep. 2010.*

Machine translation of DE 19736851, Feb. 2011.*

* cited by examiner

METHOD FOR CONNECTING COMPONENTS BY LOCAL COLD JOINING, USING FOR EXAMPLE RIVETS OR SCREWS AND LASER WELDING

PRIORITY STATEMENT

This application is the national phase under 35 U.S.C. §371 of PCT International Application No. PCT/EP2005/054650 which has an International filing date of Sep. 19, 2005, which designated the United States of America and which claims priority on German Patent Application number 10 2004 054 582.0 filed Nov. 11, 2004, the entire contents of which are hereby incorporated herein by reference.

FIELD

At least one embodiment of the present invention generally relates to a method for connecting two or more components, having surface portions overlapping one another. For example, in at least one embodiment this connection may be made via a laser beam, in which, before the laser welding, the components are fixed positively with respect to one another on at least one of the overlapping surface portions by local cold joining, preferably by rivets or screws, and are subsequently welded to one another by way of a laser beam.

BACKGROUND

A method is known from EP 0 988 917 B1. In this method, for example, a molding consisting of an investment casting, as a first component, and a thin-walled lightweight construction profile of rectangular cross section, as a second component, are fixed with respect to one another by way of rivets and are subsequently welded to one another by way of laser beam, fillet welds which run on the outsides of the first component being generated.

In another application of the known method, sheet metal strips arranged on opposite outsides are first riveted to two lightweight construction profiles of the same rectangular cross section, the end faces of which butt together, and are then connected by laser welding, specifically as a continuous fillet weld along the edges of the two sheet metal strips.

SUMMARY

At least one embodiment of the invention is directed to a method having the generic features to indicate a design and arrangement of the laser welding seams such that the play-free contact of the components which is generated due to the tension force of cold joining (for example, rivets or screws) is utilized optimally and the introduction of heat into the components caused by the laser welding is as low as possible.

In at least one embodiment of the invention, a laser welding seam is arranged in the immediate vicinity of each fixing point provided by cold joining, that is to say, in particular, as near as possible to the rivet or to the screw.

Advantageous refinements of embodiments of the invention are specified in the subclaims.

BRIEF DESCRIPTION OF THE DRAWINGS

Further, the invention is described in more detail with reference to example embodiments which are illustrated in principle in the drawing. In these example embodiments, riveting is employed as the cold joining technique, but other cold joining techniques, such as, screwing, clinching or spot bonding, may perfectly well also be provided.

DETAILED DESCRIPTION OF THE EXAMPLE EMBODIMENTS

Figure 1:
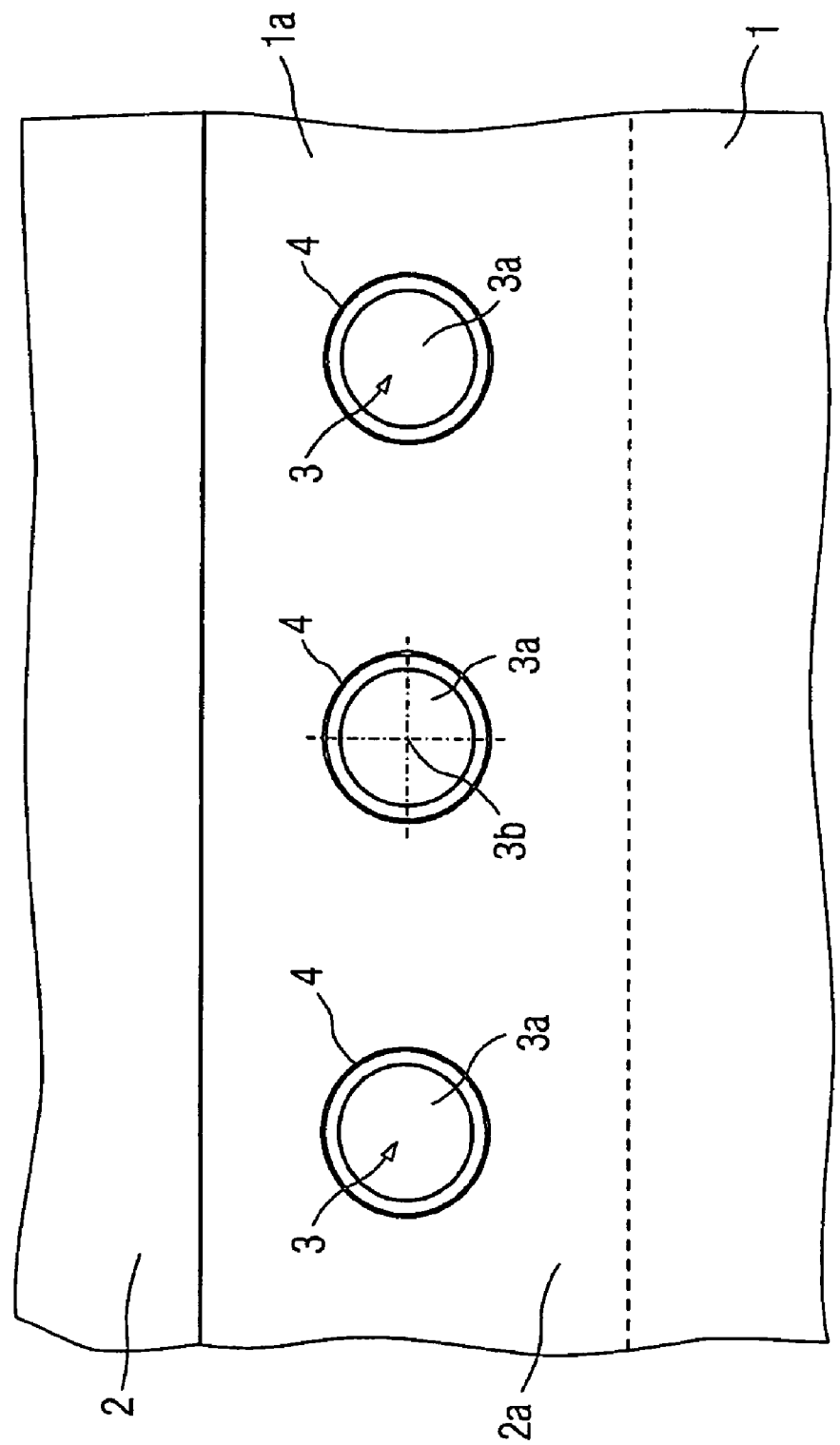
FIG. 1 to 3 show in each case a part region of two components 1 and 2 which are to be connected and which have surface portions 1a and 2a overlapping one another.
Figure 2:
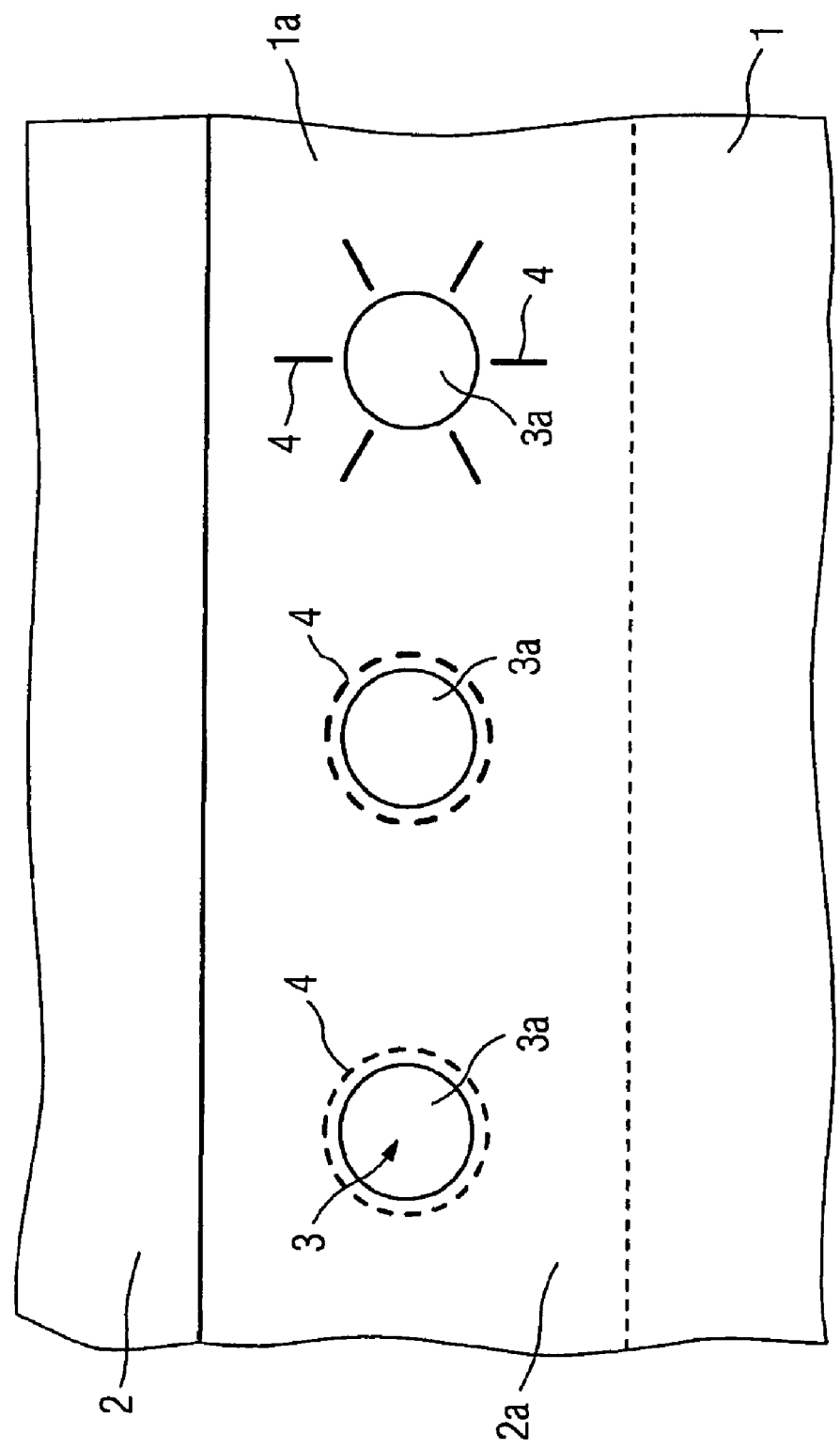
Figure 3:
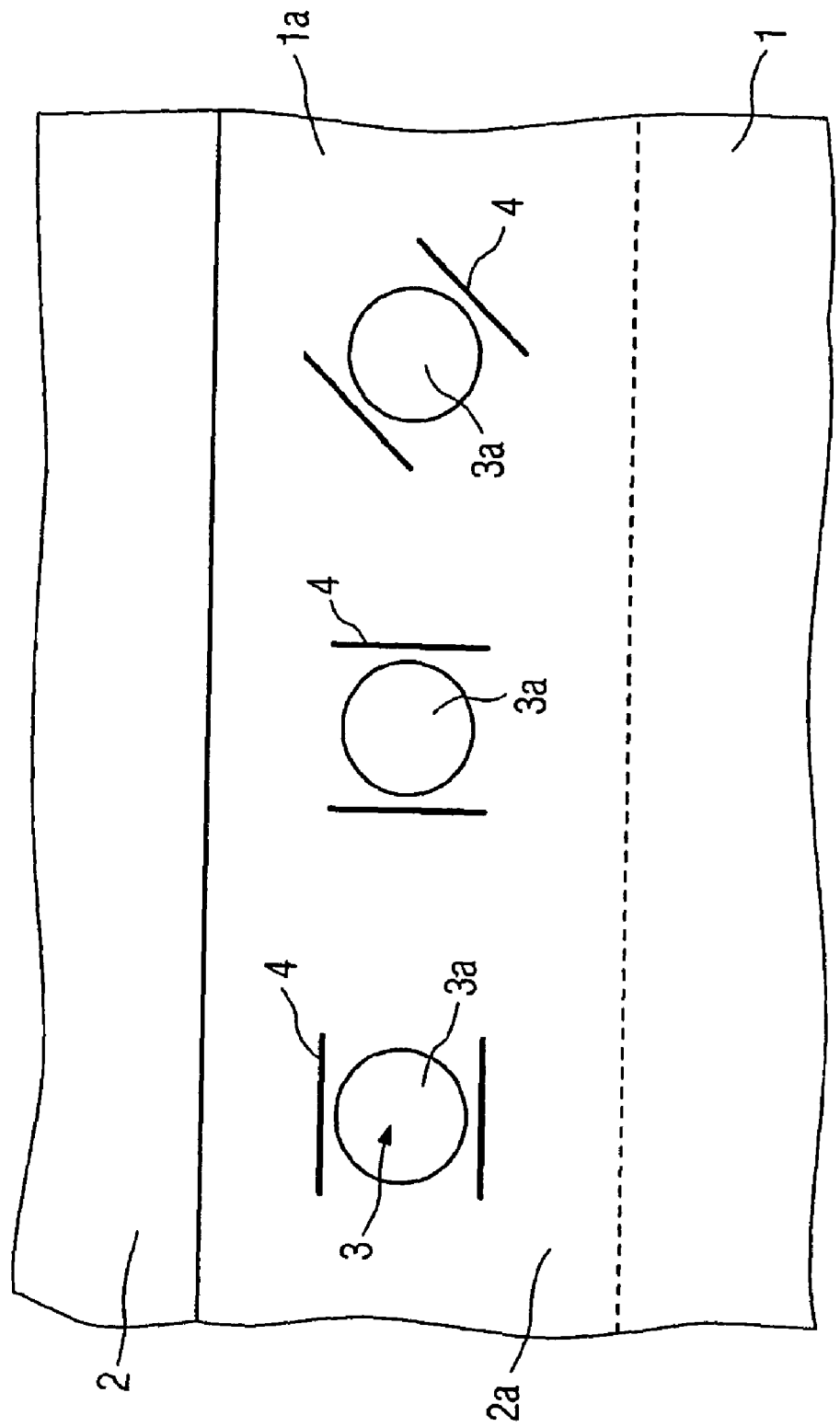

FIG. 1 to 3 show in each case a part region of two components 1 and 2 which are to be connected and which have surface portions 1a and 2a overlapping one another. Bores introduced, for example, by laser cutting into these surface portions 1a and 2a before the two components 1 and 2 are joined together are arranged preferably in such an exact grid pattern that a positioning and fixing of the components 1 and 2 are possible solely by the introduction of rivets 3a (alternatively, also screws). Separate devices or tools which, as a rule, are complicated are not required. It would be appreciated that, if the surface portions 1a and 2a overlapping one another have appropriate dimensions, additional rivet rows may be provided at a distance from the row of rivets 3a which is shown in FIG. 1 to 3. Preferred rivets 3a are blind rivets which make it possible to connect the components 1 and 2 from only one side.

In order to utilize optimally the play-free surface contact of the components 1 and 2 to be connected, which is afforded by the respective axial force over the rivets 3a especially in the vicinity of the fixing point 3, a laser welding seam 4 is drawn in the immediate vicinity of each rivet 3a, that is to say as near as possible to the rivet 3a. Owing to these approximately punctiform laser welding seams 4, only a little heat is introduced into the components 1 and 2 to be connected, so that scarcely any distortion occurs.

FIG. 1 shows the possibility of placing the laser welding seams 4 concentrically with respect to the center axis 3b of the fixing point 3 provided by the rivets 3a, these seams 4 being designed to be continuously circular. It is evident, further, from FIG. 1 that the circular laser welding seams 4 may have a width adapted to the magnitude of the stresses which arise.

Further welding seam forms are illustrated in FIGS. 2 and 3. According to FIG. 2 the laser welding seams 4 likewise running concentrically with respect to the respective rivet 3a are of circularly stitched design, different seam widths also being shown here by way of example. Moreover, FIG. 2 shows a version, according to which the rivet 3a is surrounded in a radiating manner by a number of laser welding seams 4 which are in each case of straight form.

FIG. 3 illustrates that two laser welding seams 4 formed in each case as a straight line run parallel to one another closely next to each rivet 3a. In this case, the paired laser welding seams 4 may be arranged with their length in that direction in which the highest forces to be transmitted take effect.

In the case of a number of fixing points 3, here of the rivets 3a, which is sufficient for the play-free surface contact of the components 1 and 2 to be connected, it is also possible, within a row or a pattern, to arrange between adjacent fixing points 3 in each case a laser welding seam 4 for which any of the circular or linear seam forms can be selected.

With a view to achieving as minimal a distortion as possible, it is recommended to define welding sequences. If, therefore, a long rivet row is to be provided with one of the welding patterns described above, welding should not be carried out in order but alternately. In building structures having a plurality of rivet rows, a change of sides may be incorporated into the welding sequence. This gives rise, with regard to welding shrinkage and therefore distortion, to a counteraction which reduces the distortion or deformations.

The method according to at least one embodiment of the invention is suitable for being implemented either in a highly automated manner with a corresponding investment requirement or in a mobile way without any comprehensive investment. For automation it is appropriate to use a laser welding robot, which guides the laser welding head, a scanner welding head also being highly advantageous.

For the mobile implementation of the method, manually guided laser welding heads are known which can generate linear seams by way of an automated feed. Since the welding seams are arranged in the immediate vicinity of the rivets, it is possible to design the rivet head for positioning and/or guiding the laser welding head, so that said rivet head fits with a corresponding counter piece on the welding head. For mobile implementation, a welding head with scanner optics is possible, which makes it possible to generate the circular seams (continuously or in stitch form), in that it guides the laser welding beam annularly.

With the aid of the method described here, using local cold joining, in particular by positive connection by means of rivets or screws and materially integral connection by laser welding, building structures can be produced in any desired size, for example module sections of a carriage body for rail vehicles.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for connecting two or more components, having surface portions overlapping one another, via a laser beam, the method comprising:
    positively fixing, before the laser welding, the components with respect to one another on at least one of the overlapping surface portions by local cold joining; and
    subsequently welding the components to one another via the laser beam, with a laser welding seam being arranged in an immediate vicinity of each fixing point provided by cold joining, wherein at least one of rivets and screws is used for the positively fixing, and the laser welding seam is arranged as near as possible to the at least one of rivet and screw and wherein, in a rivet row for connecting the two more surface portions overlapping one another, laser welding of the at least one of rivets and screws is carried out alternately, thereby fixing the at least one rivets and screws.

2. The method as claimed in claim 1, wherein the laser welding seam is placed concentrically with respect to the center axis of the fixing point.

3. The method as claimed in claim 2, wherein the laser welding seam is of continuously circular shape.

4. The method as claimed in claim 2, wherein the laser welding seam is configured circularly in stitch form.

5. The method as claimed in claim 1, wherein two laser welding seams are provided, which are each a straight line and which run parallel to one another next to the fixing point.

6. The method as claimed in claim 5, wherein the two laser welding seams are arranged with their length in that direction in which the highest forces to be transmitted take effect.

7. The method of claim 1, wherein at least one of rivets and screws is used for the positively fixing, and the laser welding seam is arranged as near as possible to the at least one of rivet and screw.

8. The method as claimed in claim 7, wherein the laser welding seam is placed concentrically with respect to the center axis of the fixing point.

9. The method as claimed in claim 8, wherein the laser welding seam is of continuously circular shape.

10. The method as claimed in claim 8, wherein the laser welding seam is configured circularly in stitch form.

11. The method as claimed in claim 1, wherein the fixing point is surrounded in a radiating manner by a number of laser welding seams which are each of straight form.

12. The method as claimed in claims 1, wherein at least one of rivets and screws is used for the positively fixing, and the laser welding seam is arranged as near as possible to the at least one of rivet and screw and wherein the at least one of rivet and screw used for cold joining serves for at least one of positioning and guiding the laser welding head.

13. The method as claimed in claim 1, wherein at least one of rivets and screws is used for the positively fixing, and the laser welding seam is arranged as near as possible to the at least one of rivet and screw and wherein, in building structures having a plurality of rivet rows, a change of the welding of the rivet rows is incorporated into a welding sequence.

14. A method, comprising:
    cold joining two or more components to one another on at least one of overlapping surface portions; and
    laser welding the components to one another, with a laser welding seam being arranged in an immediate vicinity of a point provided by the cold joining, wherein at least one of rivets and screws is used with the local for fixing the two or more components together, and wherein the laser welding seam is arranged as near as possible to the at least one of rivet and screw, and wherein, in a rivet row for joining the two or more components, the laser welding of the at least one rivet and screw is carried out alternately, thereby fixing the at least one rivet and screw.

* * * * *